J. Thomas.
Floating Dock.
No. 136.
Reissued May 1, 1849.
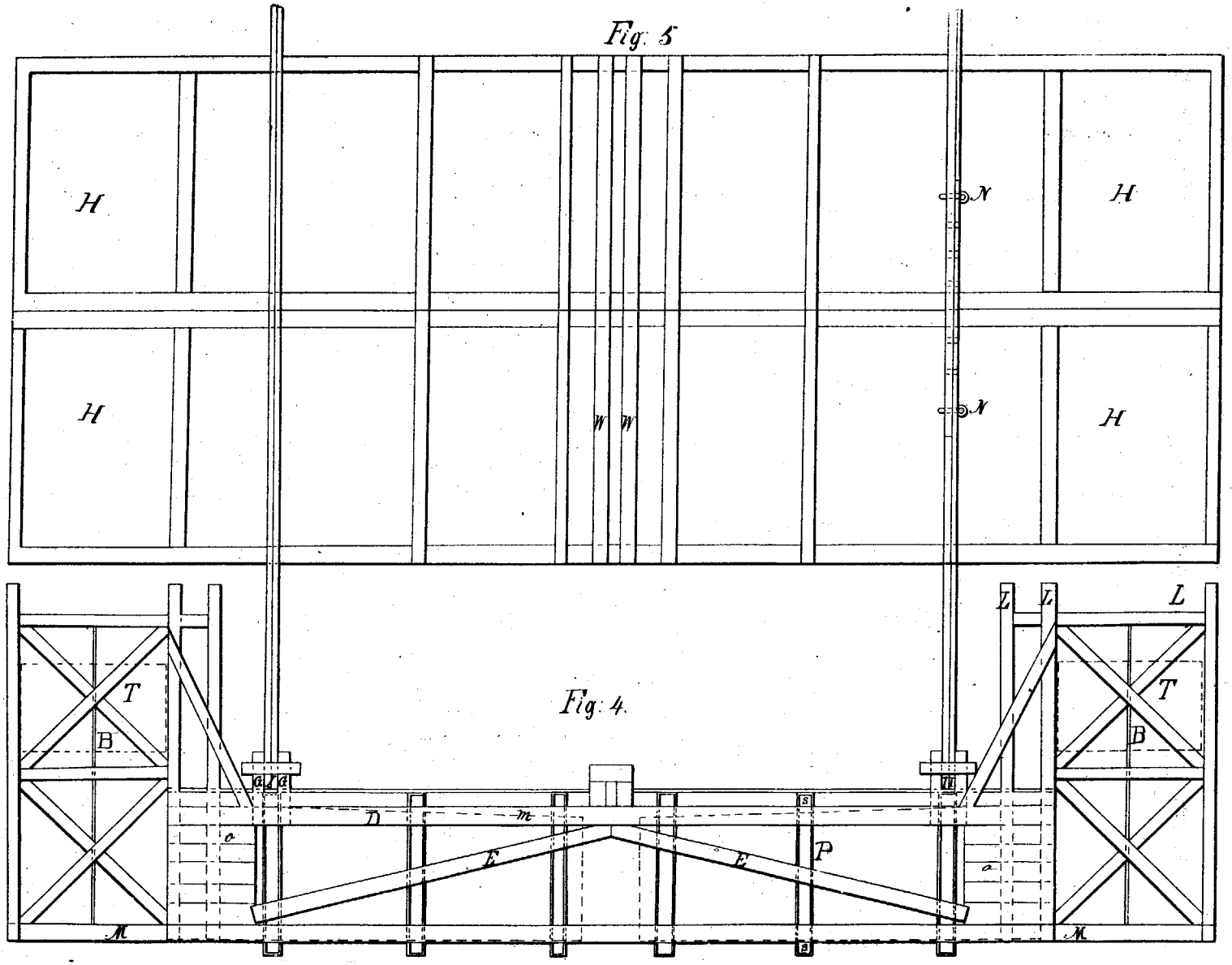
N. PETERS, PHOTO-LITHOGRAPHER, WASHINGTON, D. C.

UNITED STATES PATENT OFFICE.

JOHN THOMAS, OF ELIZABETHTOWN, NEW JERSEY.

IMPROVEMENT IN FLOATING DRY-DOCKS.

Specification forming part of Letters Patent No. 522, dated December 20, 1837; Reissue No. 135, dated May 1, 1849.

*To all whom it may concern:*

Be it known that I, JOHN THOMAS, of Elizabethtown, in the county of Essex and State of New Jersey, have invented a new and Improved Mode of Building and Equipping Sectional Floating Docks; and I do hereby declare that the following is a full and exact description.

The nature of my invention consists in providing a number of strong trussed frames connected together by strong beams at the upper and lower parts. In the space formed by the frames and beams are placed tanks or floats, in which water is let in through cocks or gates, when the dock is sunk to a depth sufficient to float the ship over the keel-blocks. To raise the ship, a part of the water is to be pumped out, when the dock with its load rises above the water a sufficient height to enable the workmen to perform the various repairs on the bottom of the ship. Other floats or tanks are placed at each end of each section, to preserve the equilibrium. The dock may consist of two or any number of sections which may be required, or any size. The sections are all alike. The one I shall describe is about sixty feet long in clear, and seventeen feet wide and eight deep.

To enable others skilled in the art to make and use my invention, I will proceed to describe its construction and operation.

Each section is made of two trussed frames—one on each side—about sixty feet long, ten deep. The length of the section is the breadth of the dock. These trussed frames are made of string-pieces, Plate 4, D D, above, and below of strong timber, about sixteen inches deep and eleven thick. Between the string-pieces, at each end, are buttresses, (marked O O, Plate 4,) strongly jogged and bolted. Each buttress is about five feet long.

The truss-pieces (marked E E, Plate 4) are next to be described. These are strong timbers thirteen inches deep and eleven thick. They come in contact at the middle under the upper string-piece. The other ends are placed against the buttresses at the lower string-pieces, so that said trusses and buttresses form an arch, as shown in the drawings marked Plate 4. These frames may have a projecting timber, (marked M M, Plate 4,) formed by and connected with the lower string-pieces, so as to receive the sills and post of the framing, which is called the "end framing," hereinafter to be described; or timbers may be bolted and otherwise secured to the frames as the foundation of said framing. The latter has been most generally adopted. The trussed frames thus described are to be connected on each side with strong beams, two of them, (marked S S, Plate 4,) thirteen inches by eleven, six beams on the lower part and six on the upper part, so that the two trussed frames, being connected by said beams, will form an open oblong square space of about fifty-eight feet long in clear, about seventeen wide, and eight deep. In the space thus formed are to be placed two tanks or floats, as shown by the dotted lines, Plate 4, letters *m m*, each of them to be nine inches deeper at the ends of the section than at the middle. They are to be kept apart in the middle of the section from two to four feet. These floats are to be framed with strong timber, and of a sufficient strength to resist the pressure of the water, which will vary according to the size. They are to be strongly planked on all sides, and made water-tight, except a man-hole on the upper part near each end, and a hole for the pump, and a small hole through which the air is to escape when the tank is to be filled with water. Two strong beams (marked W W, Plate 5) are also to be placed across the section, leaving a space between them of eighteen inches. On these beams are placed the keel-blocks on which the ship rests. Iron stirrups are to connect the other beams, one inch thick by four inches wide. Plate 4, letter P, is one of them shown. On the projecting timbers above described, and which form the end framing, are long stanchions, (marked L L L, Plate 4.) These and their appendages form the end framing. The diagonal and horizontal braces, together with the posts, stanchions, and cap-sills, constitute the end framing. To the sill and plate on each side of each end is a strong bar of iron, (Plate 4, letters B B,) one inch thick and four wide. In this bar are holes four inches apart and one and a half inch diameter, to suit which holes bolts are provided. The use of said bars is to raise and depress the end floats, which I shall directly describe, and thereby secure stability to the dock. It will be observed that the long stanchions L L L and their appendages, together with the iron bars, form an opening at each end of each section about seventeen feet long and ten wide, (Plate 5, letters H H H H.) In this space the end floats or tanks are placed. The end floats are strongly framed, to resist the pressure of the water, and are flanked and made water-tight on all sides. No water is intended to be left in them. They are shown in Plate 4 by dotted lines marked T T. The use of these floats is at all times to preserve the equilibrium of the dock, and may be depressed or raised by means of lever applied to the iron bars and bolts, as above described. There are two other short timbers or stanchions, (Plate 4, marked G G,) which I shall also be particular in describing, as they are one of the claims. These stanchions are eleven inches apart, placed near each end of each section, these stanchions being connected by a cross-piece near the upper ends, having a space of eleven inches between them. Through these square openings thus formed pieces of strong timber pass ten inches by five thick. Said timbers connect the respective sections together. These timbers must be of such length as to extend across one section and to the middle of that adjoining it. The space thus occupied by the connecting-timbers is marked I. Should it be desired to extend the sections so as to increase the length of the dock without adding to the number of sections, this may be effected by means of the connecting-timbers, through the spaces I I. These connecting-timbers are to have bolt-holes through them at a convenient distance apart—say two feet—(Plate 5, letters N N,) which will allow of the respective sections being retained at any desired distance from each other when several sections are placed together.

The manner of working said dock is as follows: When a ship is to be taken on, the dock is sunk by letting in water through the cocks or gates. Ballast is sometimes wanted in addition. When it is sunk so that the water is sufficiently deep to float the ship over the keel-blocks, she is then placed and secured in the middle. The pumping is then commenced, the cocks or gates are closed, the dock with its load rises to the surface of the water, and a little above, so as to enable the workmen to perform the repairs to the ship's bottom, the main tanks raising the ship and dock, the end tanks or floats giving perfect stability during the process of raising or lowering the ship to and from the water.

Having described the manner of building my sectional dock and the mode of working the same, I declare I do not claim as my invention the use of tanks or floats to raise vessels.

What I claim as my invention, and desire to secure by Letters Patent, is—

1. The end floats, T T, by means of which the dock may be balanced and leveled, and which may be forced down by machinery, substantially as herein described.

2. Regulating the line of motion of said floats and of applying the control exerted by them to the dock by means of guides and frames, in which they are made to move, the whole operating and constituted substantially as herein described.

JNO. THOMAS.

Witnesses:
RICHARD GRIFFIN,
WILLIAM N. WOODRUFF.